US009703444B2

(12) United States Patent
Nicholson et al.

(10) Patent No.: US 9,703,444 B2
(45) Date of Patent: Jul. 11, 2017

(54) DYNAMIC DISTRIBUTION OF CLIENT WINDOWS ON MULTIPLE MONITORS

(75) Inventors: Clark D. Nicholson, Seattle, WA (US); Kentaro Toyama, Berkeley, CA (US); Jack Creasey, Redmond, WA (US); Richard Lewis, Lynnwood, WA (US); Robert C. Elmer, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 970 days.

(21) Appl. No.: 13/076,450

(22) Filed: Mar. 31, 2011

(65) Prior Publication Data

US 2012/0254788 A1 Oct. 4, 2012

(51) Int. Cl.
| | |
|---|---|
| *G06F 3/048* | (2013.01) |
| *G06F 3/0481* | (2013.01) |
| *G06F 9/44* | (2006.01) |
| *G06F 3/14* | (2006.01) |

(52) U.S. Cl.
CPC .......... *G06F 3/0481* (2013.01); *G06F 3/1423* (2013.01); *G06F 9/4445* (2013.01); *G06F 3/1446* (2013.01); *G09G 2340/0492* (2013.01)

(58) Field of Classification Search
CPC ..... G06F 2203/04803; G06F 17/30994; G05B 2219/23136
USPC ........ 715/778, 771, 781, 764, 788, 798, 803
See application file for complete search history.

(56) References Cited

U.S. PATENT DOCUMENTS

| | | | | |
|---|---|---|---|---|
| 5,384,910 A * | 1/1995 | Torres | ................... | G06F 3/0481 715/810 |
| 5,694,150 A * | 12/1997 | Sigona | .................... | G06F 3/038 715/856 |
| 5,835,090 A * | 11/1998 | Clark | .................... | G06F 9/4443 715/764 |
| 5,923,307 A * | 7/1999 | Hogle, IV | ........... | G06F 3/04897 345/1.3 |
| 6,084,553 A * | 7/2000 | Walls | .................... | G06F 3/1446 345/1.3 |
| 6,326,978 B1 * | 12/2001 | Robbins | .................... | G06T 3/60 345/654 |
| 6,496,204 B1 * | 12/2002 | Nakamura | ............ | G06F 3/0481 715/781 |
| 7,107,549 B2 | 9/2006 | Deaton et al. | | |
| 7,472,341 B2 | 12/2008 | Albornoz et al. | | |
| 7,606,314 B2 * | 10/2009 | Coleman | ............... | G06F 3/1454 375/240.26 |
| 7,712,041 B2 * | 5/2010 | Toyama | .................. | G06F 3/038 715/751 |
| 8,266,550 B1 * | 9/2012 | Cleron | .................. | G06F 1/1633 345/173 |

(Continued)

OTHER PUBLICATIONS

Kavoom! KM, Keyboard-Mouse Switch, 2007, User's Manual.*

(Continued)

*Primary Examiner* — Matthew Ell
(74) *Attorney, Agent, or Firm* — Wade IP Law LLC

(57) ABSTRACT

A multi-user computer system may distribute user windows across multiple monitors. Some of the user windows may span two or more monitors. Some user windows may share a monitor. Each user window may be associated with a set of user input devices for each user. The user window configuration may be changed on the fly by an administrative user, who may reposition, rotate, scale, or perform other changes to the windows.

20 Claims, 3 Drawing Sheets

(56) References Cited

U.S. PATENT DOCUMENTS

| | | | | | |
|---|---|---|---|---|---|
| 8,296,728 | B1* | 10/2012 | Webster | | G06F 9/4443 717/105 |
| 8,661,360 | B2* | 2/2014 | Jeong | | G06F 3/0482 715/733 |
| 8,711,169 | B2* | 4/2014 | Tsuda | | G06F 3/04815 345/419 |
| 2001/0001271 | A1* | 5/2001 | Motomura | | G03B 17/24 396/310 |
| 2003/0048275 | A1* | 3/2003 | Ciolac | | G09G 5/14 345/544 |
| 2004/0195471 | A1* | 10/2004 | Sachen, Jr. | | F16M 11/10 248/127 |
| 2006/0026235 | A1* | 2/2006 | Schwarz | | G06Q 10/10 709/205 |
| 2006/0143571 | A1* | 6/2006 | Chan | | G06F 3/03543 715/764 |
| 2007/0024645 | A1* | 2/2007 | Purcell | | G06F 3/1431 345/634 |
| 2007/0239828 | A1* | 10/2007 | Patton | | G06Q 10/10 709/204 |
| 2008/0016461 | A1* | 1/2008 | Hoblit | | G06F 3/048 715/788 |
| 2008/0046506 | A1* | 2/2008 | Broda | | G06F 9/4443 709/203 |
| 2009/0160732 | A1* | 6/2009 | Kimura | | G01C 21/3664 345/1.1 |
| 2009/0307600 | A1* | 12/2009 | Arthur | | G06F 11/3664 715/740 |
| 2010/0053027 | A1* | 3/2010 | Tonnison | | G06F 1/1601 345/1.3 |
| 2010/0081115 | A1 | 4/2010 | Harding et al. | | |
| 2010/0083122 | A1* | 4/2010 | Kozloski | | G06F 3/023 715/737 |
| 2010/0180055 | A1* | 7/2010 | Lyon | | G06F 3/023 710/62 |
| 2010/0182247 | A1* | 7/2010 | Petschnigg | | G06F 1/1647 345/173 |
| 2010/0293504 | A1* | 11/2010 | Hachiya | | G06F 9/4443 715/806 |
| 2011/0087989 | A1* | 4/2011 | McCann | | G06F 3/04817 715/772 |
| 2011/0225544 | A1* | 9/2011 | Demar | | G06F 3/0481 715/800 |
| 2012/0066640 | A1* | 3/2012 | Kwak | | G06F 9/4443 715/788 |
| 2012/0092705 | A1* | 4/2012 | Min | | G06F 3/1205 358/1.15 |
| 2012/0159401 | A1* | 6/2012 | Pahud | | G06F 3/04886 715/863 |
| 2013/0091589 | A1* | 4/2013 | Shiakallis | | G06F 21/86 726/34 |
| 2013/0104075 | A1* | 4/2013 | Matthews | | G06F 3/0481 715/800 |
| 2013/0246936 | A1* | 9/2013 | Nancke-Krogh | | G06F 3/0481 715/750 |
| 2013/0283193 | A1* | 10/2013 | Griffin | | G06F 3/1446 715/761 |

OTHER PUBLICATIONS

Liu, Zhangbo., "A Cross-platform Multi-user Collaboration System for a Shared Large Display", Retrieved at << http://www.cs.ubc.ca/grads/resources/thesis/May08/Liu_Zhangbo.pdf >>, Dec. 2007, pp. 101.

"The Common Desktop Environment (CDE) Release 2.1", Retrieved at << http://www.opengroup.org/desktop/cde/cde.data.sheet.htm >>, Retrieved Date: Oct. 29, 2010, pp. 11.

Beavers, et al., "The Learning Experience Project: Enabling Collaborative Learning with ConferenceXP", Retrieved at << http://research.microsoft.com/pubs/70058/tr-2004-42.doc >>, Technical Report, MSR-TR-2004-42, Apr. 2004, pp. 1-9.

McCarthy, Conor., "Virtual Collaborative Learning Environments for Music: Networked DrumSteps", Retrieved at << http://citeseerx.ist.psu.edu/viewdoc/download?doi=10.1.1.156.8246&rep=rep1&type=pdf >>, May 2003, pp. 131.

"School Empowers Students and Teachers for Collaborative Learning Opportunities", Retrieved at << http://www.microsoft.com/casestudies/Microsoft-Office-Live-Communications-Server-2005/Crescent-Girls-School/School-Empowers-Students-and-Teachers-For-Collaborative-Learning-Opportunities/4000000643 >>, Sep. 2, 2007, pp. 8.

* cited by examiner

DYNAMIC DISTRIBUTION OF CLIENT WINDOWS ON MULTIPLE MONITORS

BACKGROUND

Some computer systems may have multiple users. In such systems, each user may have a set of user input devices, such as keyboards and pointing devices, as well as output devices such as monitors. The users may interact with the device in parallel, and the computer systems may appear as independent personal computers to each of the users.

SUMMARY

A multi-user computer system may distribute user windows across multiple monitors, some of the user windows may span two or more monitors, and some user windows may share a monitor. Each user window may be associated with a set of user input devices for each user. The user window configuration may be changed on the fly by an administrative user, who may reposition, rotate, scale, or perform other changes to the windows. Some embodiments may include a rule stack that may apply different levels of rules in succession to allocate user windows.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
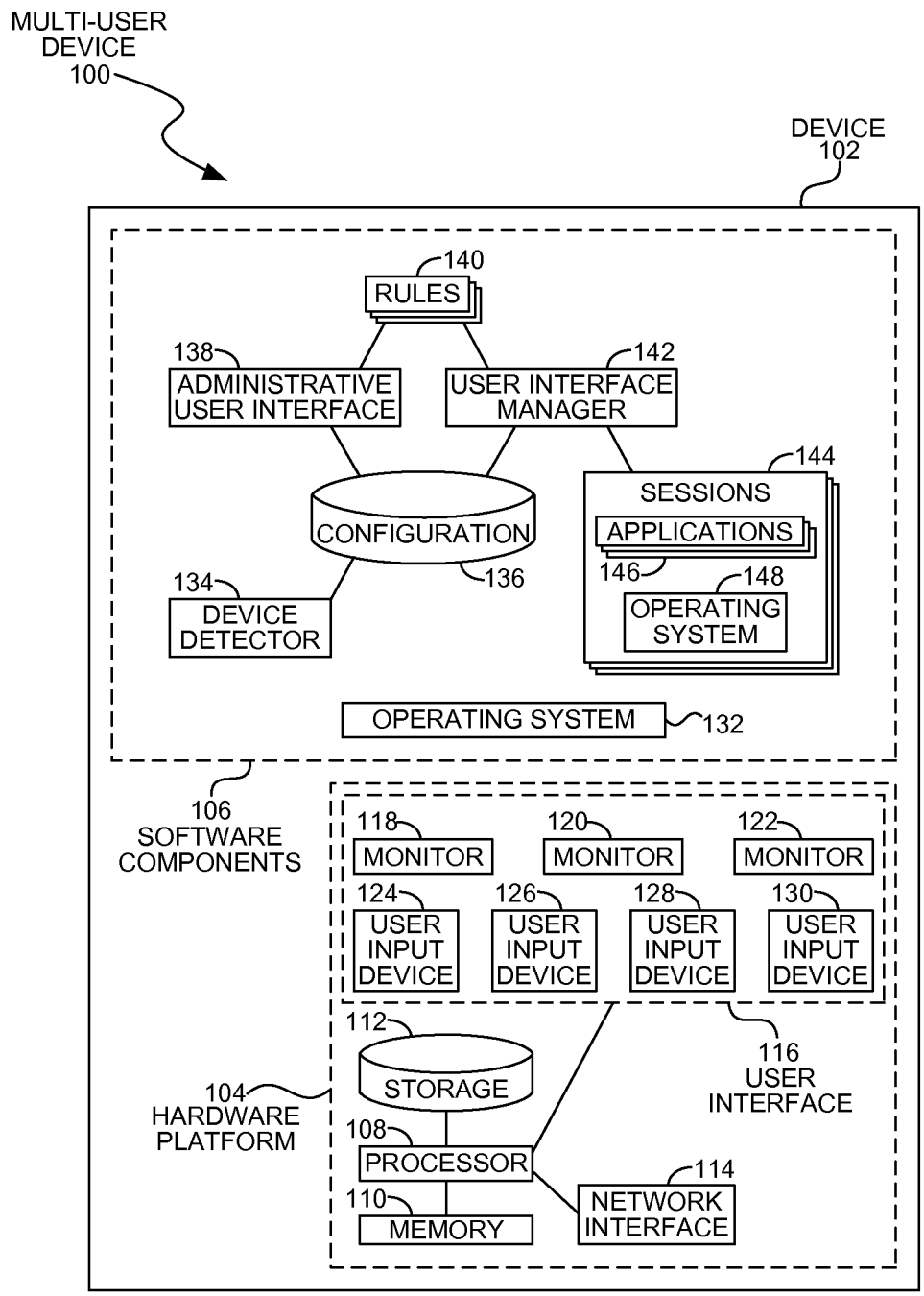
FIG. 1 is a diagram of an embodiment showing a multi-user device.

A device may have multiple user interfaces and be used by multiple people, and may have video display areas that span multiple monitors or may be shared by multiple users. The video area of all the displays may be aggregated into a large virtual display onto which user workspaces may be placed. The user workspaces may span two or more monitors, or may be less than a single monitor. In some embodiments, the user workspaces may be rotated or otherwise positioned with respect to other workspaces.

The device may have an administrative user interface through which an administrator may assign workstations that have one or more devices assigned to the user, along with a portion of the virtual display. The output of the administrative user interface may be a configuration file that contains associations between the user sessions, portions of the virtual display, and various peripheral devices, including various user input devices.

A user interface manager may use the configuration file or other definition to configure the device for various workstations. Each workstation may be configured so that the user input devices and other peripherals are directed to a single user session, which may contain operating systems, applications, or other software components that are controlled by and operate within the session. A user's experience may be as if the user were operating a separate computer from the other users of the same device, as the user may operate and control applications that are separate and distinct from other user's sessions.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a device 102 that may have multiple monitors and user input devices. Embodiment 100 is an example of a device that may have multiple user sessions, where each user may interact with the device 102 separately and independently from each other.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a multi-headed or multi-user device. Several users may each operate an independent session on the device, and each user may have their own set of input devices, such as keyboards and pointers, and may have their own display area on one or more monitors. The device 102 may have multiple monitors, and the monitors may be allocated to various users where each user's display area may be less than, equal to, or more than that of a single physical display monitor.

In many embodiments, the areas of the displays that are associated with the various users may be changed dynamically or while the device 102 is operating. Some embodiments may manage the entire display area by creating a virtual display area within a host operating system. The host operating system may be the base operating system on which the device 102 executes, and some embodiments may have separate virtual machines or other applications that execute within user sessions.

The virtual display area, sometimes referred to as a virtual work area, may represent an aggregation of all the display areas of the physical monitors. In some cases, the virtual display may contain areas that are not associated with a physical display. Within the virtual display, an administrator may create windows that may represent each user workstation. The windows may be associated with user sessions so that information from the user session are displayed in the window.

For example, an example session with a virtual machine may present a guest operating system within the window to a user. The user may interact with the virtual machine in the session to launch and use various applications. The user's experience may be that of operating the virtual machine as a standalone device, even though several users may also be interacting with the device 102 in a similar fashion.

The system of embodiment 100 is illustrated as being contained in a single device 102. The device 102 may have a hardware platform 104 and software components 106. The device 102 may have several user workstations that include peripheral devices such as user input devices and monitors.

The device 102 may represent a server or other powerful, dedicated computer system that may support multiple user sessions. In some embodiments, however, the device 102 may be any type of computing device, such as a personal computer, game console, cellular telephone, netbook computer, or other computing device.

The hardware components 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware components 104 may also include a network interface 114. The network interface 114 may include hardwired and wireless interfaces through which the device 102 may communicate with other devices.

The hardware components 104 may include multiple monitors 118, 120, and 122, as well as user input devices 124, 126, 128, and 130. In the example of embodiment 100, three monitors may be present along with four sets of user input devices. Other embodiments may have more or fewer monitors and input devices.

The user input devices may include keyboards, pointing devices such as mice or styli, audio and video input or output devices, or other peripherals. In some embodiments, the user input devices may include ports through which a user may attach various peripheral devices. Examples of such ports may be Firewire, Universal Serial Bus (USB), or other hardwired connections. Other examples may include wireless ports such as Bluetooth, WiFi, or other connection types.

The software components 106 may include an operating system 132 on which various applications may execute.

The software components 106 may include several components that may set up and manage multiple user sessions on the device 102. Each user session may have at least a portion of one monitor display area assigned, along with one or more peripheral devices.

A device detector 134 may take an inventory of the various peripheral devices attached to device 102. The device detector 134 may identify each of the various monitors, user input devices, or other peripherals and determine as much information as may be available. For example, the device detector 134 may be able to identify a monitor, detect the monitor size, resolution, and other information.

The device detector 134 may store information regarding the detected devices in a configuration database 136. In many embodiments, the device detector 134 may execute when the device 102 is turned on. After executing, the device detector 134 may compare the last saved configuration with the currently detected configuration. If the configuration has changed since the last time the device 102 was operated, the device detector 134 may cause the administrative user interface 138 to be executed so that an administrator may process any new changes.

In some embodiments, the device detector 134 may operate while the device 102 is executing. The device detector 134 may detect that a new device was connected and may be able to allocate that device to a specific user session. In cases, the device detector 134 may be able to detect that a device has been removed.

When the device detector 134 detects that a new device was connected, a set of rules 140 may be used to help determine which user session, if any, will the newly detected device be connected. For example, some embodiments may have a set of ports of connections that are previously associated with specific user sessions. In such embodiments, a newly added device may be automatically associated with the predefined user sessions using the rules 140.

The administrative user interface 138 may be a mechanism whereby an administrator may establish, configure, and edit user workspaces. In many embodiments, the operating system 132 may have a virtual workspace that contains all of the physical area of the monitors attached to the device 102. The virtual workspace may be the entire monitor area that may be addressable by the operating system 132. Within the virtual workspace, various user sessions may be created as windows within the virtual workspace.

The windows associated with the user session may display the output from various software components executing in the user session. In some embodiments, a virtual machine may execute as part of the user session and may display a guest operating system within a user's session windows. In some embodiments, a single application, browser, or other component may be controllable and accessible through a user's session.

The administrative user interface 138 may be a mechanism by which an administrator may configure the monitors and display areas or workspaces to each user session. In some cases, the workspaces may span two or more monitors, or two workspaces may share a monitor. The workspaces may be configured so that no user workspaces overlap with any other user workspaces.

The administrative user interface 138 may use a set of rules 140 that define preferences for how the various monitors and user interface components may be organized. The rules 140 may be defined in several cascading sets of rules that may define preferences for the user workstations. For example, the rules 140 may define a minimum size and configuration for certain types of user sessions. A user session for a specific type of virtual machine with a certain guest operating system may have a minimum display size and color settings, for example. Another user session in which a specific type of application is presented may have a different set of display settings.

In some cases, the rules 140 may define how a specific monitor may be configured. For example, a monitor that is oriented as the surface of a table top may be divided into two or more user workspaces. In such a monitor, one or more of the user workspaces may be rotated with respect to the other workspace. In a simple example, a large rectangular monitor may be placed on a table top and two user workstations may be oriented 180 degrees from each other so that each user may sit across from each other and view their workspaces.

The administrative user interface 138 may store a configuration in the configuration database 136. The configuration database 136 may be read by the user interface manager 142 and used to set up the various user sessions and the related user interface devices, including the monitors.

The user interface manager 142 may create the various user sessions 144 that may contain a guest operating system 148 and various applications 146. Each user session 144 may have a portion of the monitors assigned as a user workspace, as well as one or more user input devices.

The user interface manager 142 may automatically handle changes to the hardware configuration on the fly. For example, a user may attach a new device, such as a music player, to a connection port associated with their workspace. In such a case, the user interface manager 142 may detect that the device is attached and add the input and output of the device to the user's workspace.

In some cases, the administrative user interface 138 may be used to change the workspace configuration while the device 102 is operating. In such a case, an administrator may change the layout of a user workspace, for example, inside the virtual workspace of the operating system 132. After saving the updated configuration, the user interface manager 142 may cause the changes to be implemented on the existing or new user sessions.

Figure 2:
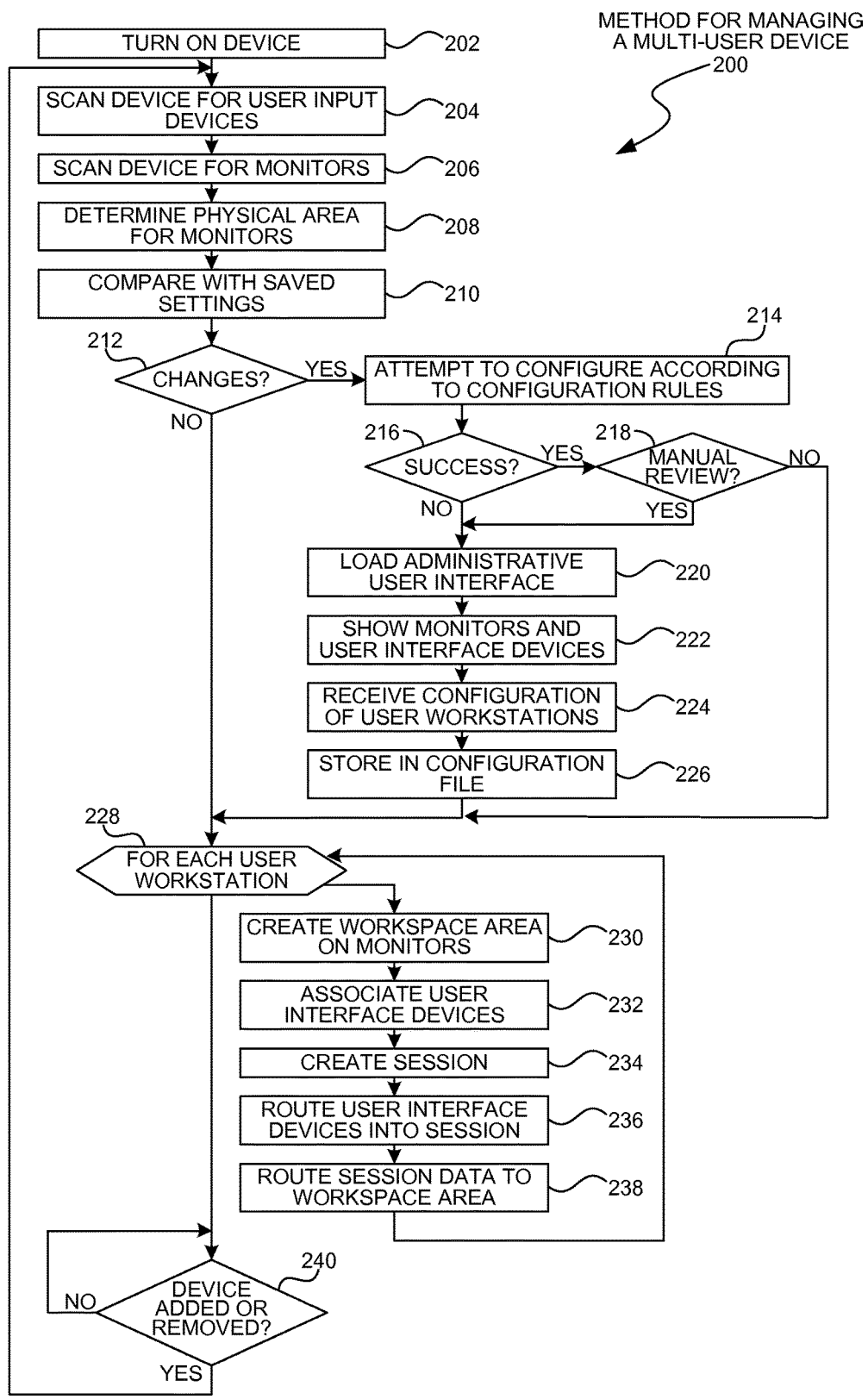
FIG. 2 is a flowchart of an embodiment showing a method for managing a multi-user device.

FIG. 2 is a flowchart illustration of an embodiment 200 showing a method for managing a multi-user device. Embodiment 200 is a simplified example of a method that may be performed by a device that has multiple monitors and multiple sets of user input devices, and that configures the user interface devices so that individual users may operate independent sessions on the device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a method by which a multi-user device may be configured and operated. The device may be configured manually with an administrative user interface or automatically using information from a configuration database and/or various configuration rules.

Embodiment 200 is a simplified example of merely one way to configure and operate a multi-user device. Other embodiments may use different mechanisms, sequencing, or processes for configuring and operating the device.

In block 202, the device may be turned on. During the startup operations, a device detector may scan the device for user input devices in block 204 and for monitors in block 206. The device detector may detect any type of peripheral device and may classify and characterize those devices.

When detecting the monitors, the device detector may determine the physical area of the monitors in block 208, along with other characteristics. In some cases, the device detector may determine the physical area in terms of the number of pixels or addressable physical space. In such cases, the physical area may not be expressed in linear dimensions but in pixel dimensions. In some embodiments, a monitor's pixel size or spacing may be determined and an actual, physical dimension may be calculated.

The detected configuration may be compared to a saved set of configuration settings in block 210. The comparison may determine if there are changes in the physical configuration in block 212. If there are no changes, each user workspace may be configured according to the predefined configuration in block 228.

If there are changes in block 212, an attempt may be made in block 214 to configure the device according to predefined rules. If the attempt is successful in block 216 and the changes are not to be reviewed by an administrator in block 218, the process may proceed to block 228 to configure the device.

If the configuration according to the predefined rules is not successful in block 216 or if a manual review of the changes is desired in block 218, an administrative user interface may be loaded in block 220. Within the administrative user interface, the monitors and user interface devices may be displayed in block 222 and a user may interactively associated portions of the monitors and user interface devices into workstations in block 224. The configuration may be saved in block 226.

The configuration of each workstation may be implemented in block 228. For each user workstation in block 228, a workspace area on the monitors may be created in block 230 and various user interface devices may be associated with the workstation in block 232. A session may be created in block 234 and input and output from user interface devices may be routed to the session in block 236. The session data that is displayed on the monitor may be routed to the monitor in block 238.

If a change to the configuration is detected in block 240, the process may return to block 204 to reconfigure the multi-user device. The changes of block 240 may be, for example, adding or removing a monitor or other user interface device. In some embodiments, the device may be able to automatically reconfigure itself by using the predefined rules.

Figure 3:
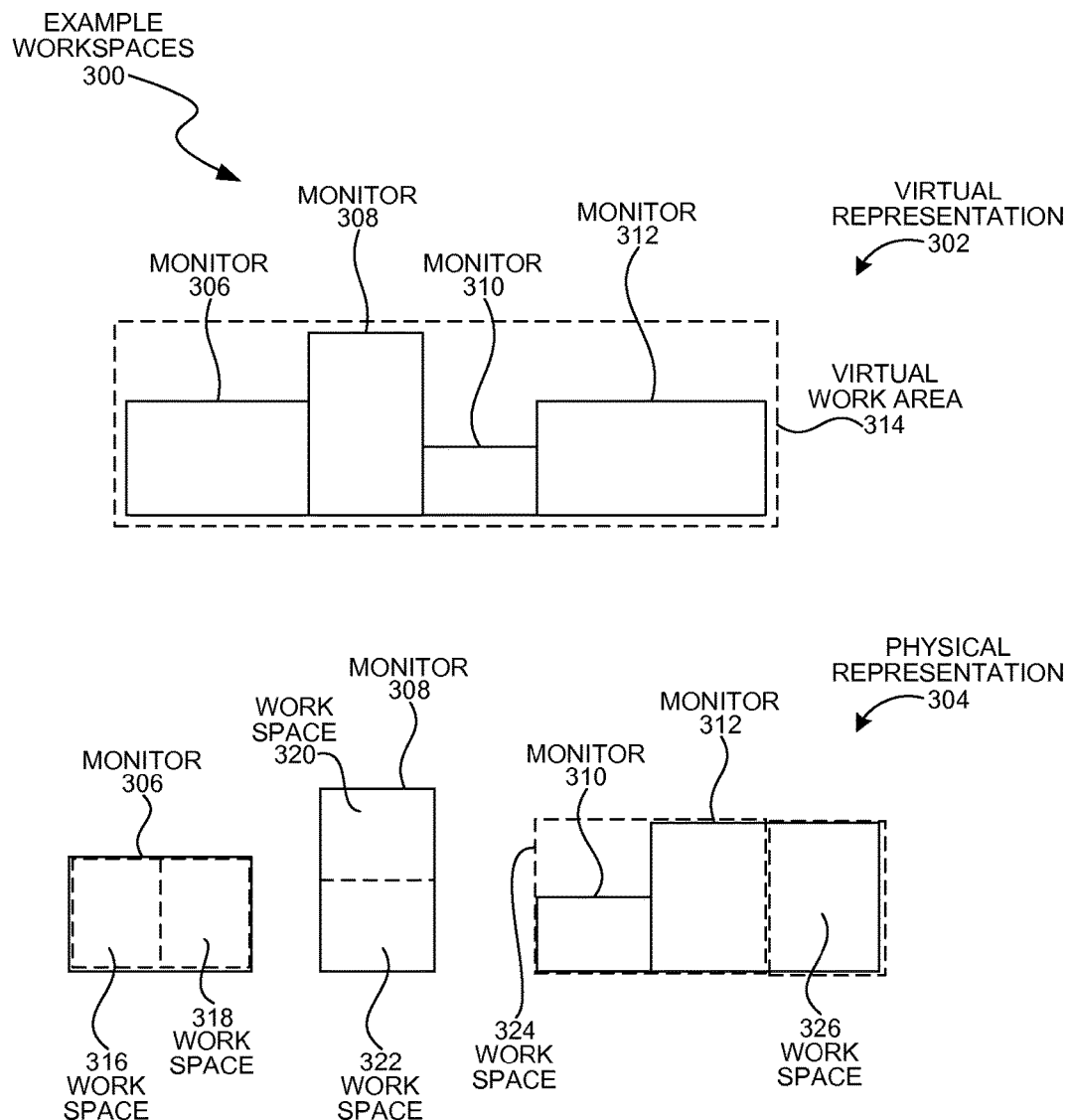
FIG. 3 is a diagram of an example embodiment showing a virtual and physical representation of a multiple monitor device for multiple users.

FIG. 3 is a diagram illustration of an example embodiment 300 showing two representations of work areas for a multi-user device. A virtual representation 302 and a physical representation 304 are illustrated.

The representations illustrate an example of a multi-user device that may have multiple monitors of varying sizes, and where different sizes user work areas may be configured. In some cases, the work areas may span two or more monitors, while in other cases, two work areas may share the same monitor.

In the virtual representation 302, each of the monitors 306, 308, 310, and 312 may be organized as if the monitors were located immediately adjacent to each other. A virtual work area 314 may be defined that encompasses all of the monitors.

The virtual work area 314 may be defined by a host operating system as the entire addressable monitor space. In many embodiments, the virtual work area 314 may have dedicated memory associated with each pixel within the virtual work area 314, so that applications may address the display directly. In some embodiments, various graphics subsystems may provide graphics processing, memory, or other objects related to a graphics output.

The virtual work area 314 may be larger than each of the monitors. In many embodiments, the virtual work area 314 may be defined as a rectangle. In some cases, such as above the limits of monitor 306, there may be some portions of the virtual work area 314 that may not have an associated physical monitor.

Within the virtual work area 314, an administrator may assign various user workspaces. In some embodiments, the administrator may drag and drop windows onto the virtual work area 314 to designate individual workspaces. In many embodiments, the workspaces may be placed anywhere on the virtual work area 314 and may span multiple monitors or portions of a monitor. Many embodiments may enforce that no two user workspaces may overlap.

The physical representation 304 may show the user workspaces assigned to the various monitors. The monitor 306 may have user workspaces 316 and 318 assigned. Similarly, monitor 308 may have user workspaces 320 and 322.

In some embodiments, the administrator may be able to rotate the user workspaces. For example, the monitor 308 may be oriented flat on a table top. The user workspaces 320 and 322 may be configured so that each user may sit across from each other. One workspace may be rotated 180 degrees from the other workspace. Other embodiments may permit the administrator to orient a workspace 45 degrees, 90 degrees, or some other angular rotation.

In the example of monitors 310 and 312, a user workspace 324 may be defined that spans all of monitor 310 and a portion of monitor 312. Another workspace 326 may be assigned to the remaining portion of monitor 312.

In some cases, a user workspace may be larger than a single monitor and sometimes larger than two or more monitors. In the example of workspace 324, the workspace may extend into a portion of the virtual work area 314 for which there is no physical monitor assigned. In such cases, the workspace may block out or remove that portion of the user workspace from being accessed.

In many embodiments, an administrator may be able to move, resize, or change characteristics of a user workspace after the device is operating. In such embodiments, the administrator may be able to create a new orientation or positioning of one or more workspaces, then cause the new workspaces to be implemented. In some embodiments, the administrator may be able to move or change workspaces dynamically such that the workspaces may be changed while a user may be interacting with the workspace.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   at least one processor;
   an operating system operable on said processor;
   a first number of display monitors;
   a second number of user input stations;
   a user interface manager that:
      determines a display area for each of said display monitors; and
      for each of said user input stations:
         identifies a corresponding monitor workspace area and creates a user session to be associated with said workspace area and one of said user input stations; and
         causes a process associated with said user session to have output displayed in said monitor workspace area, said first number of display monitors not being equal to said second number of user input stations,
   at least a first monitor workspace area of said monitor workspace areas spanning at least a portion of a first display monitor and a portion of a second display monitor of said display monitors, the first display monitor having a first portion of the first monitor workspace area, the second display monitor having a second portion of the first monitor workspace area that is different from the first portion of the first monitor workspace area,
   the first monitor workspace area corresponding to a first user,
   a second monitor workspace area of said monitor workspace areas corresponding to a second user that is different from the first user,
   the second monitor workspace area spanning at least a second portion of the first display monitor and a second portion of the second display monitor such that each of the first user and the second user has its own display areas on the first and second display monitors, the first display monitor having a first portion of the second monitor workspace area, the second display monitor having a second portion of the second monitor workspace area that is different from the first portion of the second monitor workspace area; and an administrative user interface configured to define a minimum size and configuration for a user session associated with a workspace area for a specified user input station of the user input stations based on a type of the user session.

2. The system of claim 1 further comprising:
a user interface detector that:
   scans said user input stations to identify user input devices;
wherein the user interface manager assigns said user input devices to said user input stations.

3. The system of claim 1, said user interface manager that further:
   creates a virtual display area comprising said display area, said monitor workspace area being mapped into said virtual display area.

4. The system of claim 3, said virtual display area being larger than the sum of area of said display monitors.

5. The system of claim 4, at least one of said monitor workspace areas being presented on at least two of said display monitors.

6. The system of claim 1, said user interface manager that further:
   resizes a first workspace area after operating a first user session associated with said first workspace area.

7. The system of claim 6, said resizing being performed automatically and without human intervention.

8. The system of claim 7, said resizing being defined by a set of rules defining conditions for said resizing.

9. The system of claim 8, said rules defining conditions to resize when starting a new user session.

10. The system of claim 7, said resizing being defined by an administrative user.

11. The system of claim 1, said user interface manager that further:
   applies a rotation to at least the second monitor workspace area with respect to the first monitor workspace area.

12. The system of claim 1, wherein the first display monitor has a first size and the second display monitor has a second size that is different from the first size.

13. A method performed on a computer system having a computer processor, said method comprising:
   detecting a first number of display monitors attached to said computer system;
   detecting a plurality of input devices attached to said computer system;
   determining a second number of user workstations for said computer system;
   for each of said second number of user workstations, creating a workspace area on at least a portion of said display monitors, said first number being different from said second number, comprising:
      for at least a first user workstation of said second number of user workstations, creating a first portion of a workspace area on at least a portion of a first display monitor that is included in said display monitors, and creating a second portion of the workspace area that is different from the first portion of the workspace area on at least a portion of a second display monitor that is included in said display monitors, the workspace area corresponding to a first user;
      for at least a second user workstation of said second number of user workstations, creating a first portion of a second workspace area on a second portion of said first display monitor, and creating a second portion of the second workspace area that is different from the first portion of the second workspace area on a second portion of said second display monitor, the second workspace area corresponding to a second user that is different from the first user; and
   providing an administrative user interface configured to define a minimum size and configuration for a user session associated with a workspace area for a specified user workstation of the second number of user workstations based on a type of the user session.

14. The method of claim 13 further comprising:
   identifying a new user workstation to add to said user workstations;
   resizing at least one of said workspace areas for at least one of said user workstations to accommodate a new workspace area corresponding to said new user workstation;
   creating said new workspace area within at least one of said display monitors; and
   associating said new user workstation with said new workspace area.

15. The method of claim 14, said resizing being performed at least in part according to a set of predefined rules.

16. The method of claim 13, wherein at least one of the workspace areas is presented on at least two of the display monitors.

17. A system comprising:
one or more processors;
an operating system operable on at least one of said one or more processors;
a first number of display monitors that includes at least a first display monitor and a second display monitor;
a device detector that:
   scans for and detects a plurality of user input devices;
   scans for said display monitors; and
   determines a physical display area for each of said monitors;
an administrative user interface that:
   presents said display monitors and said plurality of user input devices;
   receives a set of user workspace definitions each comprising at least one user input device and a workspace,
      a first user workspace definition comprising a first workspace that includes a first workspace portion and a second workspace portion that is different from the first workspace portion, the first workspace portion comprising at least a portion of the first display monitor and none of the second display monitor, the second workspace portion comprising at least a portion of the second display monitor and none of the first display monitor,
      a second user workspace definition comprising a second workspace that includes a third workspace portion and a fourth workspace portion that is different from the third workspace portion, the third workspace portion comprising at least a second portion of the first display monitor, the fourth workspace portion comprising at least a second portion of the second display monitor and none of the first display monitor, the first workspace corresponding to a first user, the second workspace corresponding to a second user; and stores said set of user workspace definitions; and a user interface manager that:

retrieves said set of user workspace definitions; and for each of said user workspace definitions, creates a workspace area on said display monitors and associates said respective at least one user input device, and creates a user session comprising said workspace area and said respective at least one user input device, said administrative user interface defining a minimum size and configuration for a user session associated with a workspace area for a specified user workspace definition based on a type of the user session.

18. The system of claim 17, a first display device having a display area that is less than or greater than a display area of a second display device.

19. The system of claim 18, a first workspace comprising a browser session.

20. The system of claim 17, said user interface manager that further:

automatically resizes a designated workspace area after operating a designated user session associated with said designated workspace area, said resizing being defined by an administrative user.

* * * * *